(12) United States Patent
Shashurin et al.

(10) Patent No.: US 11,554,883 B2
(45) Date of Patent: Jan. 17, 2023

(54) LIQUID-FED PULSED PLASMA THRUSTER FOR PROPELLING NANOSATELLITES

(71) Applicants: Alexey Shashurin, West Lafayette, IN (US); Yunping Zhang, West Lafayette, IN (US); Adam Patel, West Lafayette, IN (US)

(72) Inventors: Alexey Shashurin, West Lafayette, IN (US); Yunping Zhang, West Lafayette, IN (US); Adam Patel, West Lafayette, IN (US)

(*) Notice: Subject to any disclaimer, the term of this patent is extended or adjusted under 35 U.S.C. 154(b) by 332 days.

(21) Appl. No.: 16/909,835

(22) Filed: Jun. 23, 2020

(65) Prior Publication Data

US 2020/0407084 A1 Dec. 31, 2020

Related U.S. Application Data

(60) Provisional application No. 62/866,259, filed on Jun. 25, 2019.

(51) Int. Cl.
*B64G 1/40* (2006.01)
*F03H 1/00* (2006.01)

(52) U.S. Cl.
CPC ........... *B64G 1/405* (2013.01); *F03H 1/0012* (2013.01); *F03H 1/0018* (2013.01); *F03H 1/0087* (2013.01)

(58) Field of Classification Search
CPC ...... F03H 1/0012; F03H 1/0018; B64G 1/405
See application file for complete search history.

(56) References Cited

U.S. PATENT DOCUMENTS

| | | | | |
|---|---|---|---|---|
| 5,924,278 A | * | 7/1999 | Burton | F03H 1/0012 219/121.48 |
| 2013/0047578 A1 | * | 2/2013 | Gascon | F03H 1/0006 60/202 |

OTHER PUBLICATIONS

Barral, First Experimental Characterization of a Pulsed Plasma Thruster with Non-Volatile Liquid Propellant (Year: 2014).*
Shaw, Pulsed Plasma Thrusters for Small Satellites (Year: 2011).*
Szelecka, Liquid micro pulsed plasma thruster (Year: 2015).*
Hanna, Liquid pulsed plasma thruster plasma plume investigation and MR-SAT cold gas propulsion system performance analysis (Year: 2017).*

* cited by examiner

*Primary Examiner* — Arun Goyal
*Assistant Examiner* — William L Breazeal
(74) *Attorney, Agent, or Firm* — C. John Brannon; Brannon Sowers & Cracraft PC (57) ABSTRACT

A system for propelling a nanosatellite, including a pair of separated electrodes defining an ignition space therebetween a power source operationally connected to the pair of separated electrodes. Also included is a liquid propellant reservoir a pump reconnected in fluidic communication with reservoir and the ignition space and an electronic controller operationally corrected to the power source and to the pump.

5 Claims, 10 Drawing Sheets

LIQUID-FED PULSED PLASMA THRUSTER FOR PROPELLING NANOSATELLITES

CROSS-REFERENCE TO RELATED APPLICATIONS

This patent application claims priority to U.S. Provisional Patent application Ser. No. 62/866,259, filed on Jun. 25, 2019.

TECHNICAL FIELD

The present disclosure generally relates to a novel method and system for propelling a nanosatellite.

BACKGROUND

This section introduces aspects that may help facilitate a better understanding of the disclosure. Accordingly, these statements are to be read in this light and are not to be understood as admissions about what is or is not prior art.

The rapid development and application of nanosatellite technology has vastly accelerated mission complexity—sparking interest in robust, low power, and high specific impulse micropropulsion systems. Pulsed plasma thrusters (PPTs) have been extensively investigated and employed to fill such roles, debuting on the 1964 Soviet Zond 2. Like magnetoplasmadynamic engines, PPTs accelerate plasma propellant through the Lorentz-force—preferably with a minimum of thermal and electromagnetic loss. In lieu of an applied external magnetic field, an induced component resulting from current traversal through the electrodes and plasma supplies the B-field required for acceleration. High discharge currents (typically around 100 amps) enable sufficiently high J×B Lorentz-force magnitudes. Typically, PPTs utilize a capacitor bank for energy storage, which is subsequently converted into kinetic motion, heating, and propellant ionization upon initiation of the discharge. These capacitors can be charged by on-board or solar energy. Accordingly, stored energy maybe implemented in power-limited nanosatellites for attitude control maneuvers. Another particularly significant benefit to pulsed operation is increased thrust efficiency, enabled by the ability to operate at higher discharge currents without thermal electrode damage. The operation at these higher discharge currents results in a quadratic increase in thrust. In addition, unsteady operation can further prevent energy losses from radiation and electron-ion thermalization.

Typical nanosatellite PPT designs are ablative in nature (APPTs) and operate with solid phase propellants such as polytetrafluoroethylene or similar fluorocarbons. The surfaces of these propellants are vaporized with high currents, and the resulting plasma is accelerated to produce thrust. This process places a harsh limit on efficiency (typically <15%)—plagued by late-ablation and the presence of thermally expelled macroparticles. Impulse bit variability (non-uniform ablation), low mass flow control, and contamination pose further problems to the implementation of APPTs. These disadvantages are often disregarded, however, as high reliability and low tankage fractions may provide an attractive thruster option.

Gas-fed pulsed plasma thrusters (GF-PPTs) pose a stark contrast to their ablative contemporaries. These variants offer relatively high efficiencies of 20-70% and precision mass flow-control at the cost of complex injection systems. These apparatuses can strain implementation in satellites which have limited volumetric capabilities, namely CubeSats. Gas injection arrangements also place a mechanical limit on firing frequency due to the limitations Imposed by mechanical solenoid valves. Further, difficulties often arise in attempting to establish a desired mass density distribution before ignition—where inductive delay and gas injection must be properly timed.

An igniter subsystem is used to initiate PPT firing events in small satellites. Alongside carbonization, igniters are often the limiting factor in thruster operational lifetime. A variety of ignition techniques have been used with varying success ranging from 400 to 1,000,000 firing cycles. It has been demonstrated that low-energy surface flashover (LESF) is an attractive candidate for reliable and long-lasting ignition for micropropulsion systems. LESF modifies classic surface flashover between two metal electrodes separated by a dielectric material by limiting the amount of the energy available for each individual flashover event. This subsequently reduce the risk of damage to the flashover assembly. Upwards of 1.5 million breakdown events were demonstrated by the LESF igniter without significant damage to the assembly.

Thus, although PPTs with solid and gaseous propellants have been employed with limited degrees of success in nanosatellites, robust PPT systems have yet to be developed, and there remains an unmet need to address the above mentioned issues. The present invention addresses this need.

DETAILED DESCRIPTION

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the claimed technology as illustrated therein being contemplated as would normally occur to one skilled in the art to which the claimed technology relates.

A liquid-fed pulsed plasma thruster address several disadvantages associated with traditional PPT devices, such as contamination issues, non-uniform propellant consumption (leading to premature thruster failure), and complex/unreliable propellant feeding systems. FIGS. 1-6 relate to a novel liquid-fed pulsed plasma thruster (LF-PPT) micropropulsion system, and initial measurements of the thruster parameters are demonstrated.

Overview

The present novel technology relates to a liquid-fed micro propulsion system 100 for nano satellites. The system or assembly 100 includes A Lorentz-Force pulsed plasma accelerator 105 operationally connected to a low-energy surface flashover igniter assembly 110.

The assembly 100 includes a tank 120 connected in fluidic communication with pump 125. Pump 125 is connected in fluidic communication with igniter 130, typically a pair of spaced electrodes connected to power source 135. a second pair of spaced electrodes 140 are positioned to receive plasma generated by igniter 130 and accelerated by Lorentz Force arising from interaction with discharge current from the igniter 130 interacting with a self-induced magnetic field. Controller 145 is operationally connected to power source 135, pump 125, and sensor 150.

Propellant fluid 160 stored in tank 120 is pumped in predetermined amounts or quanta by pump 125 to igniter 130. A low-energy surface flashover current or spark is generated by igniter 130 and a portion of the propellant fluid 160 is ignited to yield a plasma cloud 165. The plasma cloud 165 is accelerated via Lorentz force to and through the discharge electrodes or plates 140. Information (typically temperature) is conveyed to the controller 145 for feedback loop control over the pump 125 and power source 135.

Drawing FIGS. 1A-7 illustrate a novel micropropulsion system for nanosatellite applications—a liquid fed pulsed-plasma thruster (LF-PPT) including a Lorentz-force pulsed plasma accelerator (PPA) operationally coupled with a low-energy surface flashover (LESF) igniter. A 3 µF/2 kV capacitor bank, offering shot energies of <6 J, supports PPA current pulse durations of ~16 µs with observed peaks of 7.42 kA. Plasma jet exhaust velocity was measured at ~32 km/s using a time-of-flight technique via a set of double probes located along the jet's path. Intensified charge coupled device (ICCD) photography was concurrently leveraged to visualize plasma dynamics and mechanisms of the ignition/acceleration events. A peak thrust and impulse bit of 5.8 N and 35 µN·s, respectively, was estimated using large-area Langmuir probe measurements of total ion flux produced by the thruster.

Vacuum Chamber: The experiments were conducted in two vacuum facilities with volumes of 0.069 m$^3$ and 0.66 m$^3$, respectively. Chambers were pumped using diffusion pumps to an ultimate partial vacuum pressure, of less than 6·10$^{-5}$ Torr. Each vacuum chamber was equipped with 15 kV and BNC feedthroughs for high voltage LF-PPT connections and diagnostic equipment. Chambers were equipped with viewports to allow visual observation.

Figure 1A:
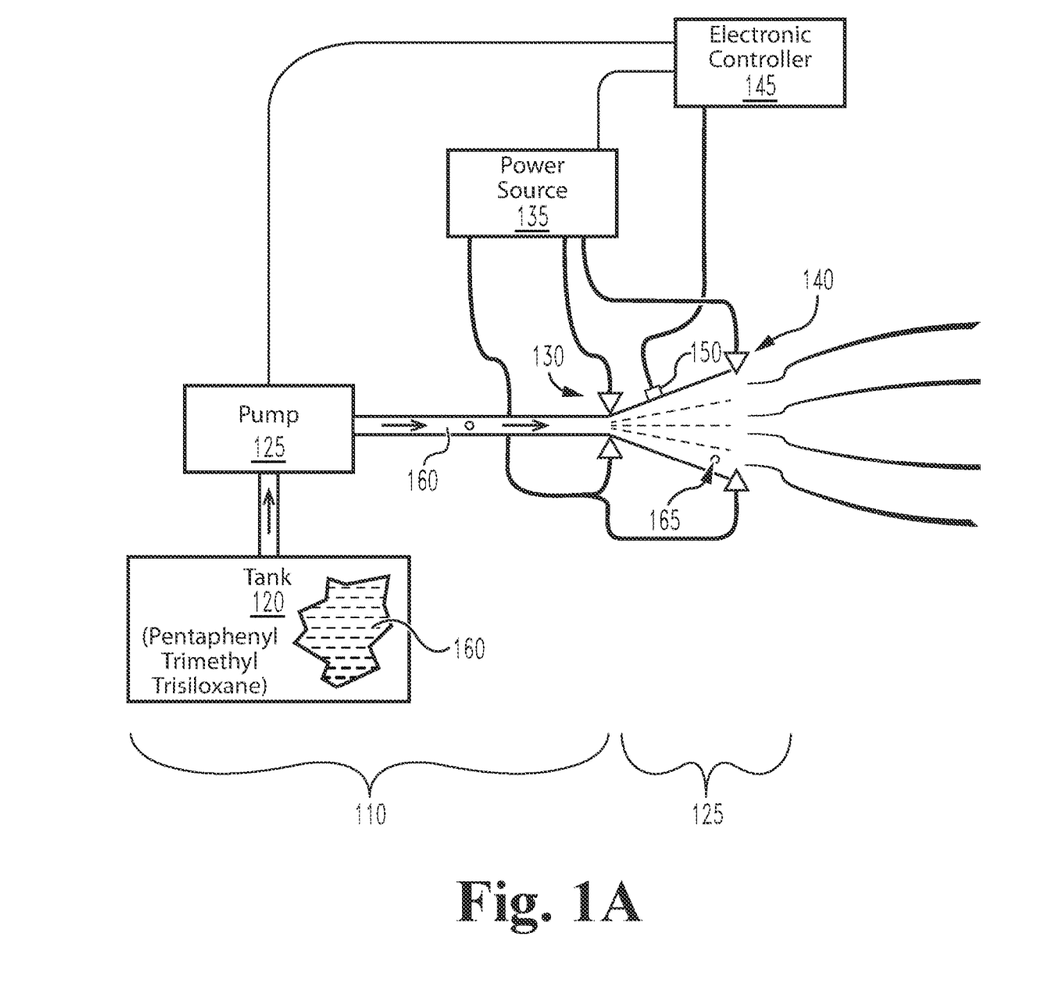
FIG. 1A is a schematic view of a Liquid-fed pulsed plasma thruster (LF-PPT) with low energy surface flashover (LESF) igniter according to a first embodiment liquid-fed pulsed plasma thruster system of the present novel technology.
Figure 1B:
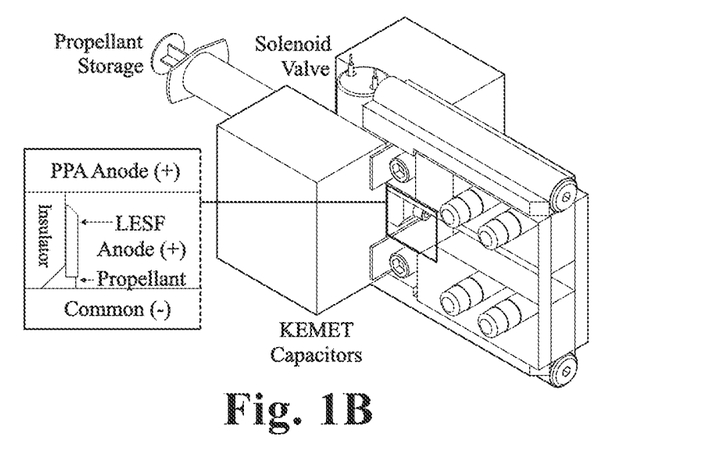
FIG. 1B is a perspective view of the system of FIG. 1A.

Electromagnetic Accelerator: The LF-PPT includes of a pulsed plasma accelerator (PPA) portion and an LESF igniter portion as shown in FIG. 1(A). The PPA was formed by a pair of oxygen-free high thermal conductivity (OFHC) copper electrodes in a parallel-plate configuration. Electrode spacing and width were both measured at 1.27 cm, with an accelerating channel length of 6.5 cm. The LESF igniter was defined by one of the PPA electrodes and an additional electrode placed between the thruster rails. Electrode spacing between LESF electrodes was measured at 2.75 mm. A liquid propellant occupied the space between these electrodes, as shown in the insert image depicted in FIG. 1(A). I the examples herein, pentaphenyl trimethyl trisiloxane ($C_{33}H_{34}O_2Si_3$) was used as a propellant due to its excellent dielectric properties and low vapor pressure. Other like propellants, such as but not limited to hydroxyammonium nitrate ($NH_3OHNO_3$), also known as AF-315E green propellant, may likewise be selected, individually or in combination. Conventionally, $C_{33}H_{34}O_2Si_3$ is used as a diffusion pump working fluid. $C_{33}H_{34}O_2Si_3$ has a high molecular weight, viscosity, boiling point (245° C. at 0.06 Torr), and flashpoint (243° C.). It is characterized by a low surface tension, low vapor pressure (3×10$^{-10}$ Torr at 25° C.), and low reactivity. The capacitance of the LESF assembly with a $C_{33}H_{34}O_2Si_3$ dielectric insert was measured at 26.6 pF. A back insulator was machined of acrylic to prevent propellant leakage and maintain the thruster's structure. The side walls containing the thruster were also manufactured of acrylic. An optional storage and solenoid valve are additionally illustrated in FIG. 1B, acting as a propellant feed mechanism. Experimental examples presented herein did not utilize a propellant feed mechanism, such as a pressurized tank/solenoid assembly or a microinjection pump, but instead the PPA assembly was oriented vertically and the interelectrode LESF spacing was manually filled with propellant.

Figure 1C:
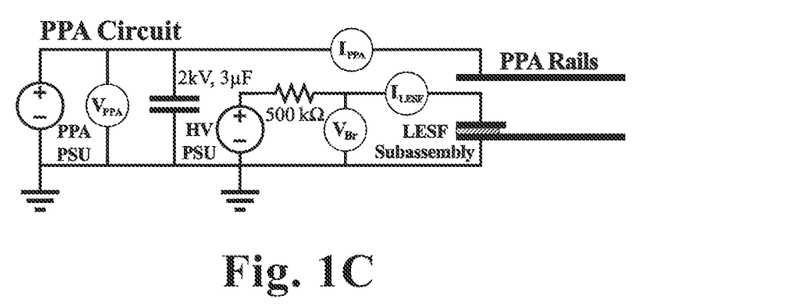
FIG. 1C is a diagrammatic view of a control circuit used with the system of FIG. 1A.
Figure 1D:
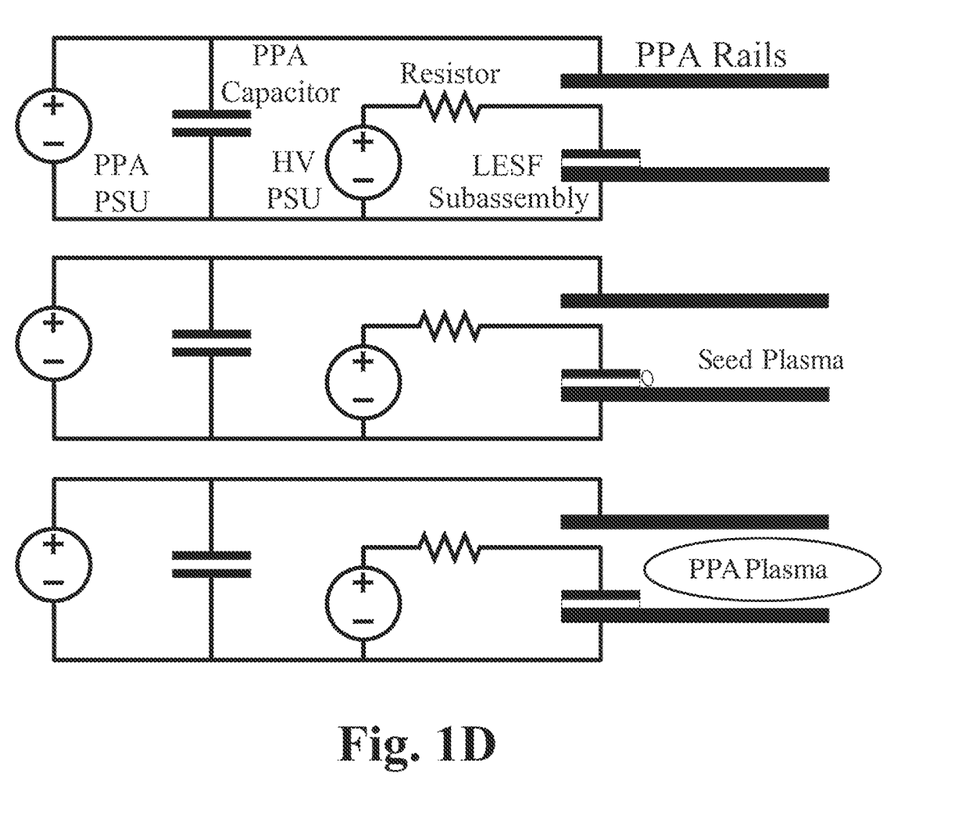
FIG. 1D is a diagrammatic view of the control circuit of FIG. 1C over time.
Figure 1E:
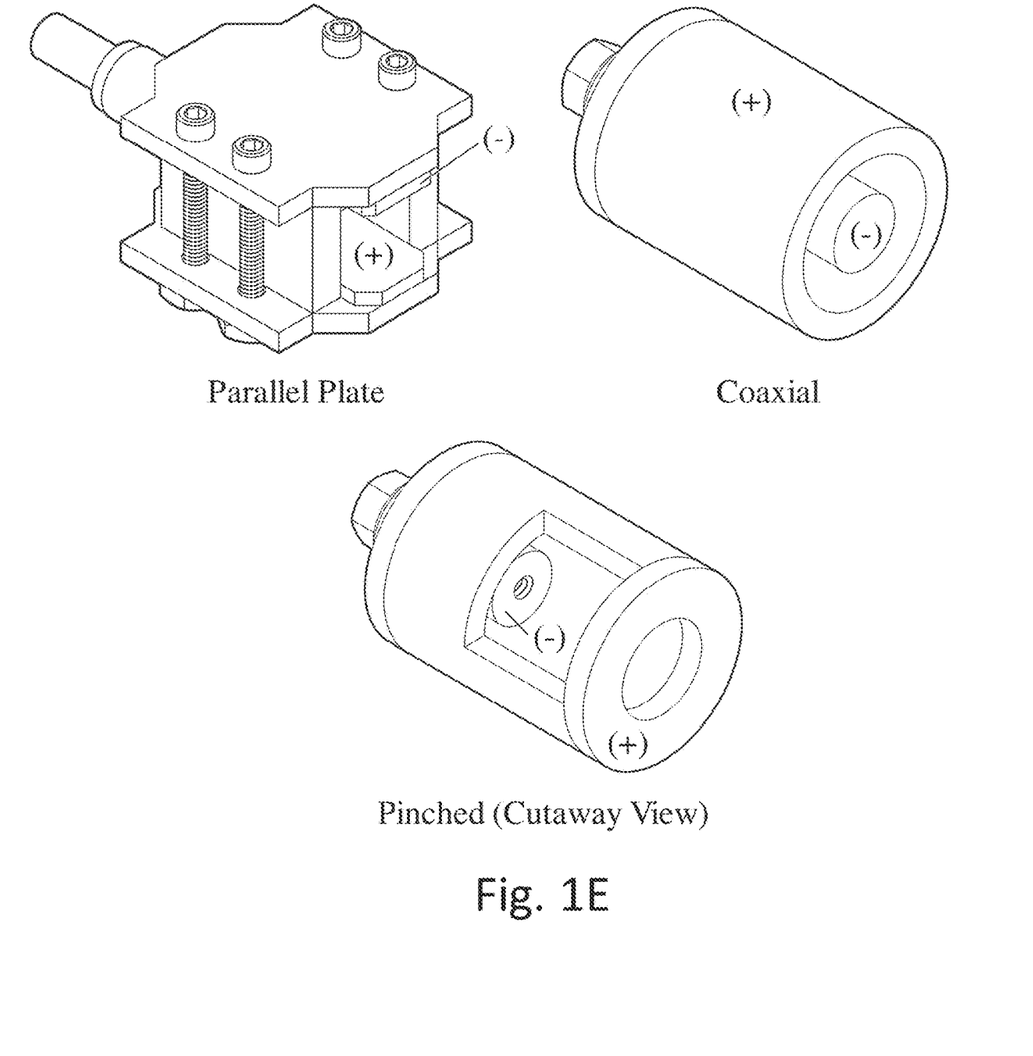
FIG. 1E is a perspective view of three different thruster configurations of the system of FIG. 1A.

Electrical schematics of the thruster are outlined in FIG. 1C. The PPA electrodes were connected to a 3 µF capacitor bank, formed by two 1.5 µF/2 kV KEMET nonpolar polypropylene capacitors connected in parallel. The capacitor bank was charged to 1.8 kV. The LESF igniter shared the negative PPA electrode as a common, accompanying the high-voltage LESF anode. High voltage up to ~8 kV was supplied to the LESF anode through a 500 kOhm current-limiting resistor.

Figure 2A:
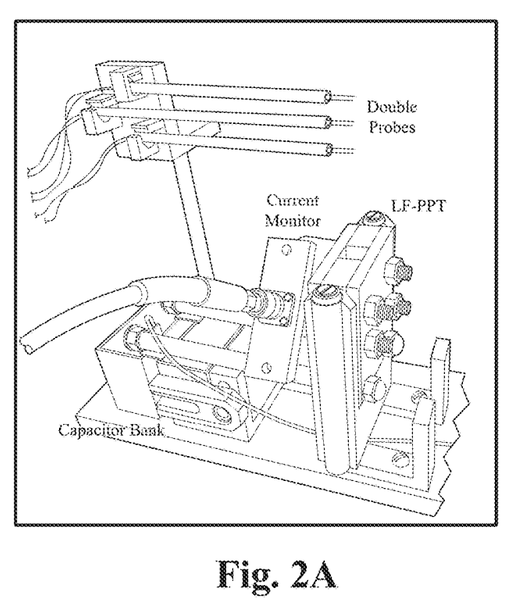
FIG. 2A is a perspective view of the system of FIG. 1A equipped with plasma diagnostics of thruster and plume parameters and having installed double probes.
Figure 2B:
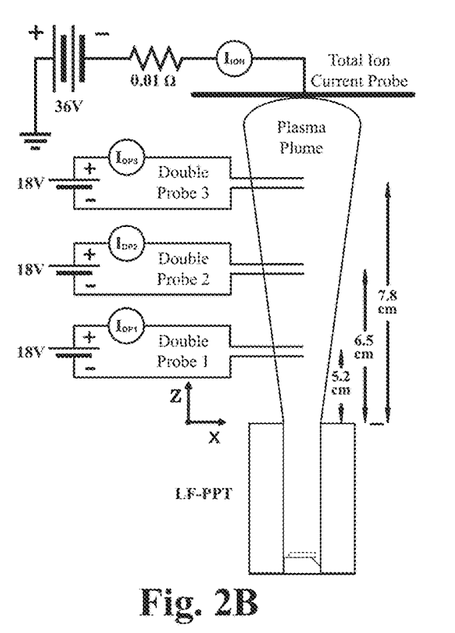
FIG. 2B is a schematic view of electrical circuitry used for exhaust plume measurements and overall geometry of the system.

Experimental Diagnostics: A photograph of the LF-PPT equipped with diagnostics is shown in FIG. 2. current monitor and voltage probe were utilized to measure the current ($I_{LESF}$) and voltage ($V_{LESF}$) of the LESF igniter. Concurrently, PPA current ($I_{PPA}$) and voltage ($V_{PPA}$) were also measured. A first order finite impulse response (FIR) digital filter was employed to smooth the discharge current waveforms. In the experimental assembly, a PTFE-insulated 316 stainless-steel extension was utilized to connect the capacitor bank to the PPA, allowing space at the PPA anode for a current monitor (measuring $I_{PPA}$) at the cost of increased impedance. All instrumentation was read through an oscilloscope.

To visualize LESF igniter breakdown and PPA plasma dynamics, an intensified charge coupled device (ICCD) with appropriate software was utilized. Long exposure photos were taken by a camera.

For exhaust velocity determination, a set of three double probes was utilized as shown in FIG. 2(A). The probes were located at 5.2, 6.5, and 7.8 cm from the PPA exhaust. Each probe was constructed with a dual channel alumina insulator, 22 ga copper wire, and was voltage-biased to 18 V. The circuits for these probes are illustrated in FIG. 2B. Currents $I_{DP1}$-$I_{DP3}$ corresponding to the double probes were measured with three current monitors. A first order finite impulse response (FIR) digital filter was employed to smooth the double probes' current waveforms.

The total ion current generated by the LF-PPT was measured using a large-area single Langmuir probe with a diameter of 16.5 cm. The current collected by the probe was directly measured by a Bergoz fast current transformer as shown in FIG. 2B. A shunt resistor of 0.1 Ohm and 36 V lead-acid batteries were utilized in the test circuit. To confirm that EMI contribution to the probe signal is negligible, a series of test experiments with a PTFE-film covered Langmuir probe were conducted prior to taking the probe measurements.

Figure 3A:
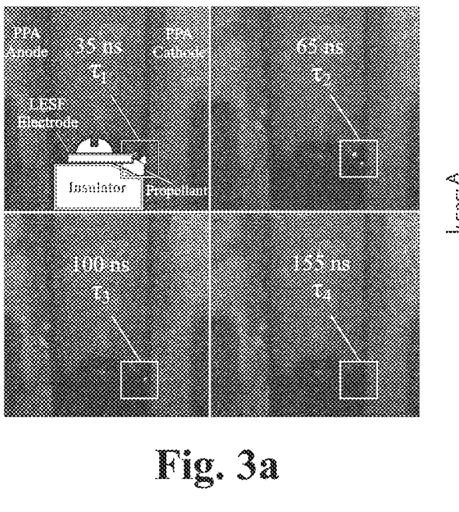
FIG. 3A graphically illustrates measurements of electrical parameters and intensified charge-coupled photographs of an LESF ignition event showing current and voltage waveforms during a single flashover event, where timestamps $\tau_1$-$\tau_4$ correspond to FIG. 3B.
Figure 3B:
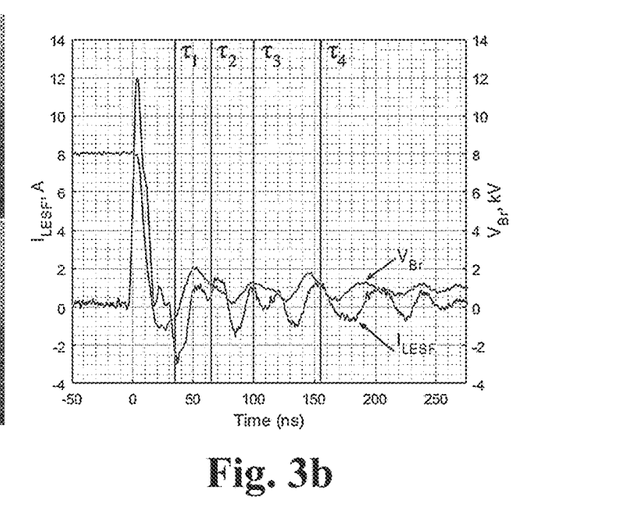
FIG. 3B illustrates the flashover event of FIG. 3A at 35 ns, 65 ns, 100 ns, and 150 ns with exposure time 3 ns.

Low Energy Surface Flashover Igniter: V-I waveforms and a corresponding series of fast photographs of an independent LESF are shown in FIG. 3 ($V_{PPA}$=0 V in this example). It was observed that breakdown occurred when $V_{LESF}$ reached about 8 kV. The inception of surface flashover is signified by a drop in the voltage at t=0 as illustrated in FIG. 3A. A subsequent generation of seed plasma shorts the LESF assembly electrodes and triggers a resonant ringing in the LC-circuit, formed by the plasma column shorted flashover assembly. The current oscillations peaked at 12 A and decayed on the time scale of 100-200 ns (this decay time provides an estimate of flashover duration time). The flashover decay time of 100-200 ns is further confirmed by fast ICCD photography taken at moments of time $\tau_1$-$\tau_4$ (35, 65, 100 and 155 ns, respectively) with 3 ns exposure, depicted in FIG. 3(B). One can see that the flashover plasma vanished at about t=100-155 ns after the flashover initiation. Initial energy stored in the flashover assembly's capacitance of C=26.6 pF prior the breakdown was approximately $E_0$=½$CV^2$=0.85 mJ. The oscillation period of T=25 ns observed experimentally was consistent with the shorted LESF assembly inductance of L=0.6 µH.

Figure 4A:
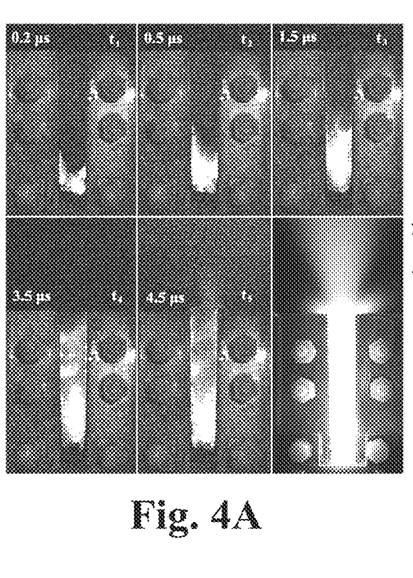
FIG. 4A graphically illustrates simultaneous V-I waveform measurements vs. time for a single pulsed-discharge, where timestamps $t_1$-$t_5$ correspond to FIG. 4B
Figure 4B:
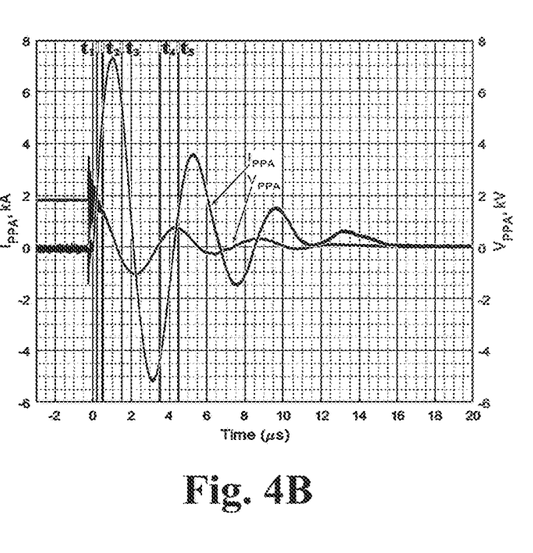
FIG. 4B illustrates a single pulsed-discharge firing event at timestamps 0.2 μs, 0.5 μs, 1.5 μs, 3.5 μs, ad 4.5 μs with exposure time 100 ns.

Accelerating Channel Dynamics: It was observed in the example that the LESF flashover event triggered PPA discharge when DC voltage was applied to the PPA electrodes. This is illustrated in FIG. 4, where voltage and current waveforms of the PPA are presented along with visual ICCD camera observation. Considerable noise was observed around t=0 due to the LESF ignition event. Following the generation of seed plasma by LESF, capacitor voltage ($V_{PPA}$) dropped from an initial value of 1.8 kV and arc current ($I_{PPA}$) rose to a peak of 7.42 kA. The decaying oscillations of current and voltage shifted approximately 90 degrees, indicating operation in the underdamped LCR regime. To visualize the dynamics of plasma acceleration in PPA, ICCD images (100 ns exposure) taken at timestamps $t_1$-$t_5$ of the discharge cycle are illustrated in FIG. 4B. A 1 second long exposure photograph of the PPA firing event is additionally depicted for reference. One can clearly see plasma front propagation inside the PPA assembly from the location of seed plasma creation (near the LESF at the bottom of the channel) towards the exit of the PPA channel. Plasma front propagation speed varied in the range 10-30 km/s.

Figure 5A:
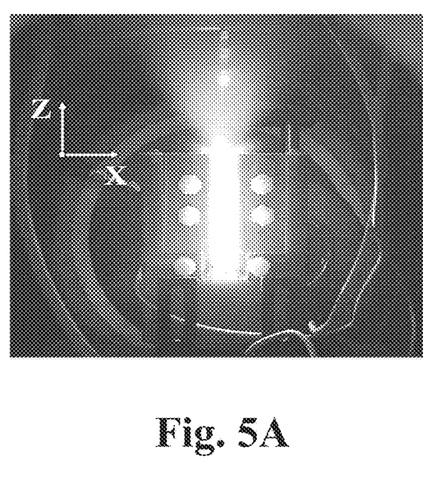
FIG. 5A illustrates double probes submurged in an LF-PPT plume; probes $I_{DP1}$-$I_{DP3}$ are spaced 5.2, 6.5, and 7.8 cm from the thruster exit, respectively.
Figure 5B:
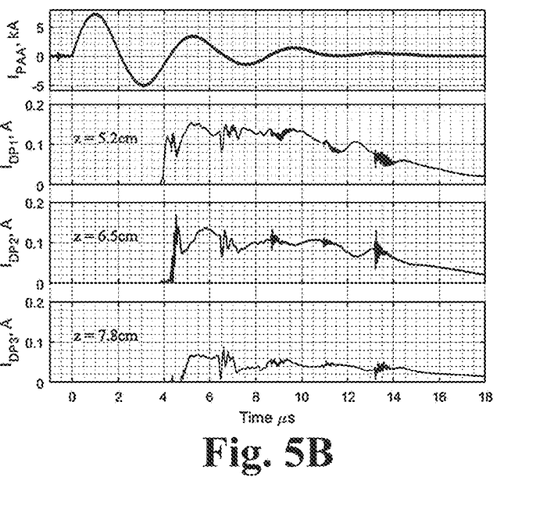
FIG. 5B graphically illustrates time-of-flight measurements of LF-PPT exhaust velocity, where $I_{DP1}$-$I_{DP3}$ correspond to current measured in 18V biased double probes with Rogowski coils.

Exhaust Plume Propagation: The set of three double probes exposed to the LF-PPT exhaust plume is photographed in FIG. 5A. The $I_{PPA}$ and current waveforms measured by the three double probes ($I_{p1}$, $I_{p2}$, and $I_{p3}$), located at z=5.2, 6.5, and 7.8 cm, are depicted in FIG. 5B. The moment of plasma arrival to each double probe is indicated by a corresponding rise of the double probe current. One can see that plasma reached the probes at z=5.2, 6.5, and 7.8 cm at 3.9, 4.3, and 4.7 µs, respectively. Plasma arrival times were used in conjunction with probe spacing to estimate exhaust velocity at $u_i$≈32 km/s.

Figure 6:
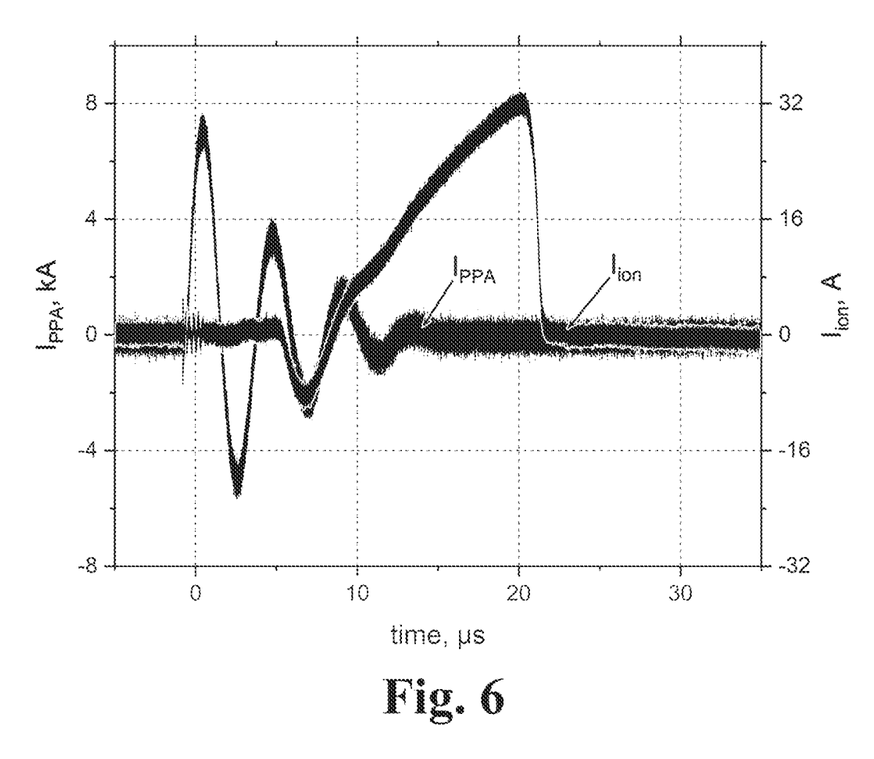
FIG. 6 graphically illustrates LF-PPT discharge current and total exhaust plume current measured by the single Langmuir probe.
Figure 7A:
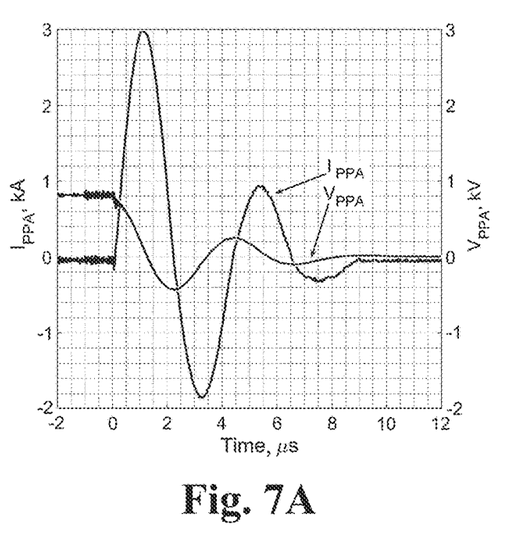
FIG. 7A graphically illustrates discharge current and voltage over time.
Figure 7B:
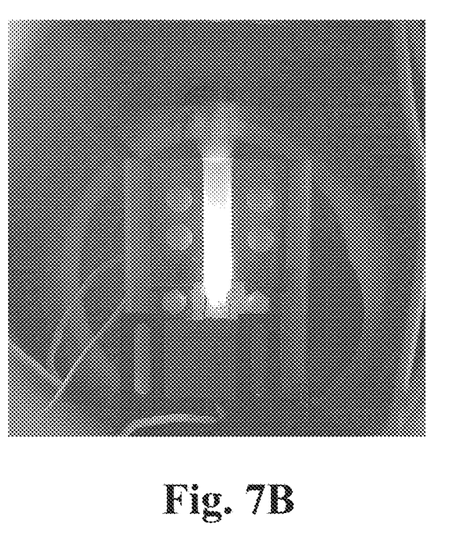
FIG. 7B illustrates successful thruster operation.

Total Current Measurement: Total ion current produced by the PPA ($I_{ion}$) and measured by the large-area Langmuir probe is presented in FIG. 6, along with the IPPA waveform. The negative current precursor seen at t≈7 µs after PPA discharge ignition can be potentially attributed to the fast electron front arrival. The bulk of plasma arrival is indicated by the positive pulse of ion current which peaked at t~20 µs. Instantaneous thrust produced by the plasma ions can be roughly estimated from the measured total ion current through $$T = \dot{m}_i v_i = \frac{I_{ion}}{Z|e|} M v_i,$$

where $\dot{m}_i$, $v_i$, Z and M are the ion mass flow rate, average exhaust velocity, average ion charge number, and propellant molecular mass, respectively. Using measured ion velocity $u_i$≈32 km/s, and assuming Z=1 and propellant ion mass to be 546.9 amu, one can estimate peak thrust value on the order of T≈5.8 N corresponding to the peak ion current $I_{ion}$=32 A. Impulse bit ($\Delta P$=∫Tdt) of the LF-PPT can be estimated at 35 µN·s using a simple trapezoidal approximation.

An initial characterization of the thruster was conducted, including electrical parameter measurements of pulsed plasma accelerator and LESF igniter, and visual demonstration of the plasma dynamics. Time-of-flight measurements were used to estimate ion velocities in excess of 32 km/s. Thrust and impulse bit were estimated at 5.8 N and 35 µN·s, respectively, based on total ion current measurements. The results reported in this disclosure provide valuable information to enable development of a flight-ready LF-PPT. Propellant optimization, numerical simulation, longevity studies, and a comprehensive performance analysis are planned in ordinance with this development.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

The invention claimed is:

1. A method for propelling a nanosatellite, the method comprising:
   feeding a predetermined quantity of liquid propellant to an interelectrode space;
   vaporizing and ionizing the liquid propellant in the interelectrode space to yield a plasma cloud; and
   accelerating the plasma cloud by a Lorentz force;
   wherein the liquid propellant is pentaphenyl trimethyl trisiloxane.

2. A liquid-fed pulsed plasma thruster assembly, comprising:
   a first pair of separated electrodes defining an ignition space therebetween;
   a capacitive power source operationally connected to the first pair of separated electrodes;
   a liquid propellant reservoir containing pentaphenyl trimethyl trisiloxane;
   a pump connected in fluidic communication with the liquid propellant reservoir and the ignition space;
   an electronic controller operationally corrected to the capacitive power source and to the pump; and
   a second pair of separated electrodes positioned to receive and accelerate a plasma plume from the ignition space;
   wherein the electronic controller may send a first signal to the pump to urge a predetermined amount of pentaphenyl trimethyl trisiloxane into the ignition space;
   wherein the electronic controller may send a second signal to the capacitive power source to energize the first pair of separated electrodes to ionize the predetermined amount of pentaphenyl trimethyl trisiloxane into a plasma cloud;
   wherein the second pair of separated electrodes generates a Lorentz force to accelerate the plasma cloud away from the ignition space.

3. The liquid-fed pulsed plasma thruster assembly of claim 2, wherein the second set of electrodes is a pair of separated parallel plates.

4. The liquid-fed pulsed plasma thruster assembly of claim 2, wherein the second set of electrodes is a pair of coaxial curved plates.

5. The liquid-fed pulsed plasma thruster assembly of claim 2 wherein the first set of electrodes generates a breakdown voltage of 8 kV to ionize the predetermined amount of pentaphenyl trimethyl trisiloxane.

* * * * *